(12) United States Patent
Bayart et al.

(10) Patent No.: US 6,836,488 B2
(45) Date of Patent: Dec. 28, 2004

(54) CASCADED RAMAN FIBER LASER, AND OPTICAL SYSTEM INCLUDING SUCH A LASER

(75) Inventors: Dominique Bayart, Clamart (FR); Carlos De Barros, Boulogne-Billancourt (FR); Thierry Lopez, Paris (FR); Xavier Normandin, Bures-s/-Yvette (FR)

(73) Assignee: Alcatel, Paris (FR)

( * ) Notice: Subject to any disclaimer, the term of this patent is extended or adjusted under 35 U.S.C. 154(b) by 99 days.

(21) Appl. No.: 10/339,341

(22) Filed: Jan. 10, 2003

(65) Prior Publication Data

US 2003/0138000 A1 Jul. 24, 2003

(30) Foreign Application Priority Data

Jan. 11, 2002 (EP) .............................................. 02360025

(51) Int. Cl.[7] ................................................ H01S 3/30
(52) U.S. Cl. ................................ 372/3; 372/6; 372/23; 372/98; 372/102
(58) Field of Search ......................... 372/3, 6, 23, 98, 372/102

(56) References Cited

U.S. PATENT DOCUMENTS

| | | | | |
|---|---|---|---|---|
| 5,815,518 A | * | 9/1998 | Reed et al. | 372/6 |
| 5,982,791 A | * | 11/1999 | Sorin et al. | 372/25 |
| 6,594,288 B1 | * | 7/2003 | Putnam et al. | 372/3 |

FOREIGN PATENT DOCUMENTS

| | | | | |
|---|---|---|---|---|
| EP | 0 651 479 B1 | | 5/1995 | |
| EP | 0984532 A1 | * | 3/2000 | H01S/3/30 |
| EP | 0984532 A1 | | 3/2001 | |
| EP | 0651479 B1 | * | 7/2001 | H01S/3/30 |

OTHER PUBLICATIONS

Mermelstein et al.; "A High–Efficiency Power–Stable Three Wavelength Configurable Raman Fiber Laser"; Optical Fiber Communication Conference (OFC).*

Mermelstein et al.: "A High–Efficiency Power–Stable Three–Wavelength Configurable Raman Fiber Laser", OFC 2001, pp. PD1–PD3.

M. Pacheco, et al.: "Chirping Optical Fiber Bragg gratings using tapered–thickness piezoelectric ceramic", Electronics Letters, Nov. 26, 1998, vol. 34, no. 24, pp. 2348–2350.

M. M. OHN et al.: "Dispersion Variable Fibre Bragg Grating Using a Piezoelectric Stack", Electronics Letters, Oct. 10, 1996, vol. 32, No. 21, pp. 2000–2001.

(List continued on next page.)

*Primary Examiner*—Don Wong
*Assistant Examiner*—Leith A Al-Nazer
(74) *Attorney, Agent, or Firm*—Sughrue Mion, PLLC

(57) ABSTRACT

The present invention relates to a cascaded multi-wavelength Raman fiber laser adapted for emitting radiation of at least one wavelength $\lambda_{s1}$, with a length of optical fiber (13) having input (15) and output (16) sections, means (11) for introducing pump radiation of wavelength $\lambda_p$ into said length of optical fiber (13), at least one pair of spaced-apart reflector means (151,161; . . . ; 159, 169), defining an optical cavity belonging to said optical fiber, each of said reflector means having a center wavelength, the reflector means of each pair being located respectively at said input section (15) and said output section (16) of said optical fiber and at least one of said pairs of reflector means having its reflector means located at said output section (16), called output reflector means (161, 162, 163), having a lower reflectivity at said center wavelength than the corresponding reflector means of the same pair (151, 152, 153) located at said input section (15), so as to emit radiation of said output wavelengths out of said optical fiber (13).

17 Claims, 2 Drawing Sheets

OTHER PUBLICATIONS

M. D. Mermelstein et al., "Cofigurable Three–Wavelength Raman Fiber Laser for Raman Amplification and Dynamic Gain Flattening", IEEE Photonics Technology Letters, IEEE, Inc., NY, US, vol. 13, No. 12, Deember 2001 pp. 1286–1288, XP001076759.

B. J. Eggleton et al., "Electrically Tunable Power Efficient Dispersion Compensating Fiber Bragg Grating", IEEE Photonics Technology Letters, IEEE Inc. New York, US, vol. 11, No. 7, Jul. 1999, pp. 354,056 XP000845984.

M. D. Mermelstein et al., "A High–Efficiency Power–Stable Three–Wavelength Configurable Raman Fiber Laser", Optical Fiber Communication Conference (OFC). Technical Digest Postconference Edition. Anaheim, CA, Mar. 17–2, 2001, Trends in Optics and Photonics Series. tops, vol. 54, Washington, WA, OSA, US, vol. 4 of 4, Mar. 22, 2001, pp. 1–3, XP001075793.

* cited by examiner

CASCADED RAMAN FIBER LASER, AND OPTICAL SYSTEM INCLUDING SUCH A LASER

BACKGROUND OF THE INVENTION

The invention is based on a priority document EP 02 360 025.7 which is hereby incorporated by reference.

The present invention belongs to the field of cascaded Raman fiber lasers as well as to devices and systems containing such elements.

Raman amplification is known to be effective to provide a flat gain over a wide signal wavelength band when using several pump wavelengths. Broadband Raman amplification is therefore used to amplify signals over a wide wavelength band, and is thus of particular interest in WDM (Wavelength Division Multiplexing) optical transmission systems.

In order to provide the necessary pump wavelengths for the Raman amplification to be efficient (i.e. for the gain to be substantially flat), it is known to use a cascaded Raman laser having several output channels. The article "A high-efficiency power-stable three-wavelength configurable Raman fiber laser", Mermelstein et al., Paper PD3, OFC 2001 discloses a WDM system using a multi-wavelength cascaded Raman fiber laser to provide pump wavelengths of 1427, 1455 and 1480 nm to a broadband Raman amplifier.

Cascaded Raman fiber lasers are known per se e.g. from document EP-0 651 479.

Such lasers comprise a length of optical waveguide, typically silica-based optical fiber, and means for introducing pump radiation of wavelength $\lambda_p$ into the length of optical waveguide. The device further comprises n (n≧2) spaced apart pairs of reflector means that define optical "cavities" for electromagnetic radiation of a predetermined wavelength, the cavities comprising at least a portion of the length of optical waveguide. Each reflector has an associated center wavelength $\lambda_i$ of a reflection band, and two reflectors of a given pair have substantially the same center wavelength, such that the reflectors of a given pair define an optical cavity of length $L_i$ for radiation of wavelength $\lambda_i$ essentially equal to the center wavelength of the reflectors of the given pair. With $\Delta\lambda_i$ (i=1, ..., n) being a length within the appropriate Stokes band associated with the fiber, $\lambda_i=\lambda_{i-1}+\Delta\lambda_i$ ($\lambda_0=\lambda_p$). The reflectors have a high reflectivity, typically greater than 95%.

Therefore, the pump power can be converted, in a multiplicity of stages, to a power at a desired longer wavelength. The wavelength $\lambda_i$ at a given stage is determined by the center wavelength of the relevant pair of reflectors, provided that the center wavelength is chosen such that the wavelength difference ($\Delta\lambda_i$) between the preceding stage ($\lambda_{i-1}$) and the given stage ($\lambda_i$) is within the Stokes band associated with the optical fiber. Such a laser further comprises a low reflectivity reflector for radiation of wavelength $\lambda_s$ on the output side of the device, so that most of the power of wavelength $\lambda_s$ is coupled out of the laser.

Thus, cascaded Raman lasers are based on Raman scattering, which is a non-linear optical process that involves coupling of light propagating through a non-linear medium to vibration modes of the non-linear medium an re-radiation at a different, typically longer wavelength. A photon is reflected back and forth in each optical cavity before undergoing Raman scattering that results in a photon of longer wavelength that then passes out of the cavity into the next optical cavity.

When a silica-based optical fiber is used as the non-linear medium, the maximum Raman gain occurs at a frequency shift of 13.2 THz, corresponding to a wavelength shift of about 50 to 100 nm for pump wavelengths between about 1000 and 1500 nm.

A cascaded multi-wavelength Raman fiber laser differs from a single-wavelength Raman fiber laser as described above in that it has several output wavelengths at the same time. It is based on the idea of splitting the Raman gain between several Stokes wavelengths having similar power levels in order to obtain several output wavelengths at the same time. To do so, the output reflectors of the pairs of reflectors having the desired output wavelengths as center wavelengths have a low reflectivity, so that most of the power of the desired output wavelengths is coupled out of the laser.

The known cascaded multi-wavelength Raman fiber laser described in the above article is configurable, i.e. the power at each wavelength can be varied by changing the reflectivity of the Bragg gratings used to form the cavity. However, the power dynamic range of the output pump channels of such a configurable multi-wavelength Raman fiber laser is not sufficient.

Indeed, when the outputs of the multi-wavelength Raman fiber laser are used as pump wavelengths for a broadband Raman amplifier for example, it is important that such pump wavelengths have precisely controlled respective powers, namely in order to ensure a similar power level on each output channel. This is not possible with the laser described in the above article.

Besides, it is also desirable to be able to select the required number of output wavelengths; in other words, it is desired to be able to use the three-wavelength Raman fiber laser described in the above article as a two-wavelength laser, or even as a single-wavelength laser.

SUMMARY OF THE INVENTION

It is therefore a goal of the present invention to provide a multi-wavelength cascaded Raman fiber laser having precisely controllable output power on each output channel, and also being suitable for use with less output wavelengths than the maximum possible output wavelengths.

To this end, the object of the present invention is a cascaded multi-wavelength Raman fiber laser adapted for emitting radiation of at least two distinct wavelengths $\lambda_{s1}$, $\lambda_{s2}$, comprising:

a length of optical fiber having input and output sections means for introducing pump radiation of wavelength $\lambda_p$ into said length of optical fiber at least one pair of spaced-apart reflector means, defining an optical cavity belonging to said optical fiber, each of said reflector means having a center wavelength, the reflector means of each pair being located respectively at said input section and said output section of said optical fiber at least one of said pairs of reflector means having its reflector means located at said output section, called output reflector means, having a lower reflectivity at said center wavelength than the corresponding reflector means of the same pair located at said input section, so as to emit radiation of said output wavelength out of said optical fiber where the reflectivity vs. wavelength function of said output reflector means is such that the difference between the wavelengths of maximum and minimum reflectivity is at least 1 nm so that the reflectivity of said output reflector means at said output wavelengths is adjustable.

Preferably, said difference of wavelengths is at least 3 nm, and still more preferably at least 4 nm.

By choosing output reflector means having an adjustable reflectivity at the output wavelengths, it is possible to dynamically adjust the power of the output channels so as to precisely ensure a similar power level on each output channel, which is required when the laser is used as a pump for broadband Raman amplification.

Therefore, precise values of the reflectivity of each output reflector means are obtained which allows equalization of the power of the output channels.

In addition, it has been found that the power of the output channels also depends from the length of the fiber, the intra-cavity losses and the splicing losses. It is therefore all the more important to use adjustable output reflectors according to the invention as there are many parameters which may influence the output powers. The laser according to the present invention allows a dynamic control of the output power.

Preferably, the center wavelength of said output reflector means is adjustable. This is allows to "de-couple" the center and output wavelengths of the output reflector means; as the output power of the reflector means is maximum at its center wavelength, shifting the center wavelength of the output reflector means thus allows to adjust the output power.

In this context, adjustment of the center wavelength of said output reflector means can be made by increasing said center wavelength.

According to a preferred embodiment of the invention, the reflectivity vs. wavelength function of said output reflector means has a substantially triangular or Gaussian shape.

Adjustment of the reflectivity of the output reflectors means may be carried out, according to the invention, by adjusting the center wavelength of the reflection band of said output reflector. A preferred solution to reach such a goal is to choose a filter function of the reflector means having a shape which is not a step, and which is close enough to a triangle.

Indeed, in such a case, it is possible to gradually change the output power, which allows the maximum flexibility.

In a preferred embodiment for WDM applications, the laser comprises at least two pairs of reflector means and is adapted for emitting radiation of at least two distinct wavelengths $\lambda_{s1}$, $\lambda_{s2}$.

When the reflector means are Bragg gratings, this can be done by submitting said Bragg grating to strain (by heating or mechanically) in order to alter its transmission characteristics by e.g. changing its pitch. Changing the pitch of the Bragg grating leads to a shift of its center wavelength.

In such a case, the reflector means which are not output reflector means are such that the difference between their wavelengths of maximum and minimum reflectivity is less than or equal to 0.5 nm.

Advantageously, the reflector means other than the output reflector means have a full width at half maximum reflection bandwidth of at least 2 nm. This allows to have a maximum reflected power into the cavities.

The reflector means located at said input section and whose center wavelengths are equal to said output wavelengths can have a full width of 2 nm at a reflectivity value at 10 dB under the maximum.

In addition, said output reflector means have a full width at half maximum reflection bandwidth less than or equal to 2.5 nm, which is thin enough to precisely define the output wavelength.

The present invention also relates to an optical fiber communication system comprising a fiber laser according to the invention, further comprising:

transmitter means that comprise means for generating a signal radiation of wavelength $\lambda_{signal}$ receiver means spaced apart from said transmitter means that comprise means for detecting the signal radiation at $\lambda_{signal}$, optical fiber transmission means that connect said transmitter and receiver means means for coupling the output radiation of wavelength $\lambda_{s1}$ of said Raman laser into said optical fiber transmission means.

The invention also relates to an optical Raman amplifier comprising a fiber laser according to the invention.

BRIEF DESCRIPTION OF THE DRAWINGS

These and other objects of the present invention will be appear more clearly from the following description of a preferred embodiment of the present invention, given by way of example with respect to the accompanying drawings.

In the drawings:

In the figures, common elements or elements having the same function are identified by the same reference numerals.

FIG. 1 schematically depicts an exemplary embodiment of a Raman laser 10 according to the invention. Pump radiation of wavelength $\lambda_p$, e.g. 1117 nm, from pump source 11 comprising a $Yb^{3+}$ laser is coupled via coupler 12 into a germano-silicate single mode optical fiber 13, and radiations of wavelengths 1440, 1455 and 1487 nm are emitted from the output end of the fiber.

Figure 1:
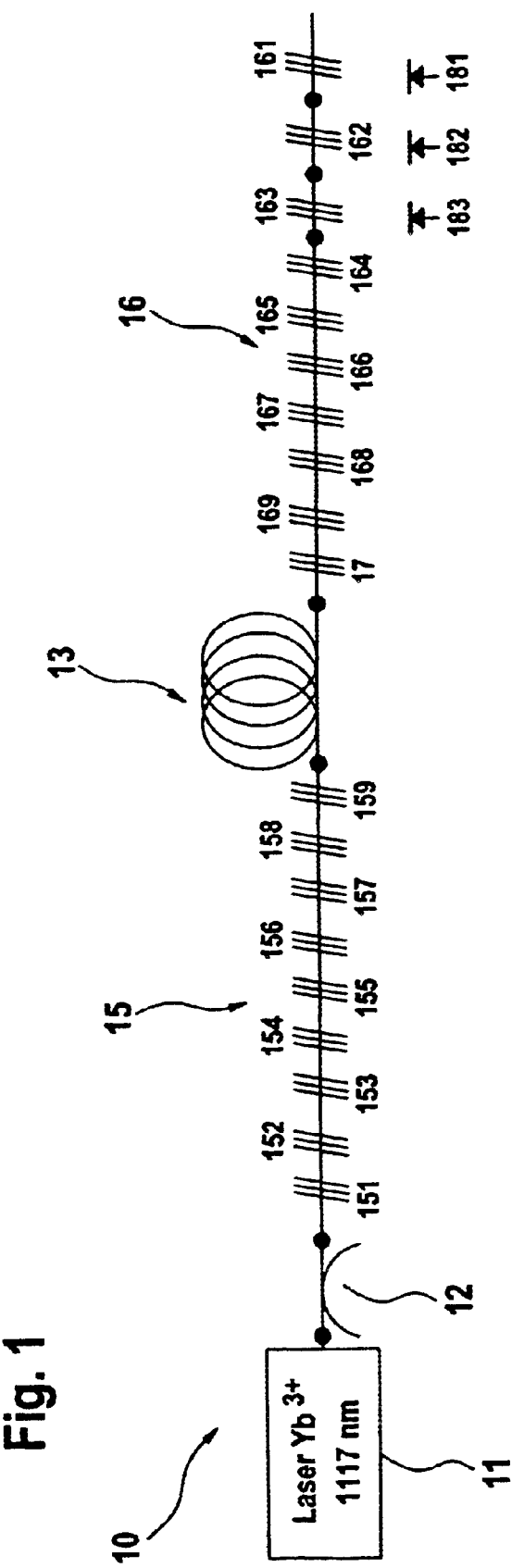
FIG. 1 schematically depicts a cascaded Raman fiber laser according to the invention

The fiber 13 has an input section 15 and an output section 16, and comprises in-line refractive index gratings such as Bragg gratings 151 to 159, 161 to 169. Gratings 151 and 161, 152 and 162, . . . 159 and 169 form matched reflector pairs of e.g. center wavelengths 1170, 1229, 1292, 1364, 1306, 1394, 1440, 1455 and 1487 nm respectively. Gratings 151 to 159 belong to input section 15, and gratings 161 to 169 belong to output section 16. All gratings except gratings 161, 162 and 163 desirably have high reflectivity, with substantially more than 98% reflectivity at the center wavelength.

Reflectivity of a grating (or of any reflector means) is defined as the ratio between the power of the optical wave reflected by the grating to the power of the optical wave entering the grating at a given wavelength. Hence, the lower the reflectivity at a given wavelength, the higher the output power of the reflector (i.e. the power of the wave not reflected by the reflector and thus transmitted by the reflector) at said given wavelength. For Bragg gratings, reflectivity is maximum at their center wavelength.

Pairs 151–161, 152–162 and 153–163 of gratings have respective initial center wavelengths equal to the output wavelengths of laser 10. The reflectivity of Bragg gratings 161, 162 and 163 at their center wavelength is lower than that of the respective corresponding gratings 151, 152 and 153. It is e.g. in the order of 20%, in order to emit the output wavelength out of the laser.

In addition to the gratings 151 to 159 and 161 to 169, an optional grating 17 can be used, having a center wavelength equal to $\lambda_p$. It serves as pump reflector.

The reflectivity of each of the Bragg gratings 161, 162 and 163, called output Bragg gratings, is adjustable at the output wavelengths. To this end, it has been chosen to adjust the center wavelength of Bragg gratings 161, 162 and 163.

Indeed, if the center wavelength of an output Bragg grating is shifted, the reflectivity of this grating at the output wavelength is decreased as compared to its initial value. The initial value of the reflectivity is the one for which the center wavelength of said output grating is equal to, or even preferably lower than the center wavelength of the corresponding input grating, which is in turn equal to an output wavelength of the laser).

By selecting, according to the invention, an appropriate profile of the reflectivity vs. wavelength function of the output Bragg gratings, it is then possible to perform simple and accurate adjustments of the center wavelength of the output Bragg gratings.

Indeed, typical Bragg gratings have reflectivity vs. wavelength functions showing a profile having substantially the shape of a step. Such profiles already allow an adjustment of the center wavelength, but without enough precision in the choice of the reflectivity among intermediate values between the maximum and minimum values of the reflectivity. If, according to the invention, a profile such that the difference between the wavelengths of maximum and minimum reflectivity is at least 1 nm is chosen for the output Bragg gratings 161, 162 and 163, a better and more precise control of the reflectivity is obtained. This is the case in particular when choosing a profile having a triangular or Gaussian shape. The full width at half maximum reflection bandwidth of the output Bragg gratings is preferably less than or equal to 2.5 nm.

Optimal results are obtained when the difference between the wavelengths of maximum and minimum reflectivity is at least 3 nm, and more preferably at least 4 nm.

Figure 2:
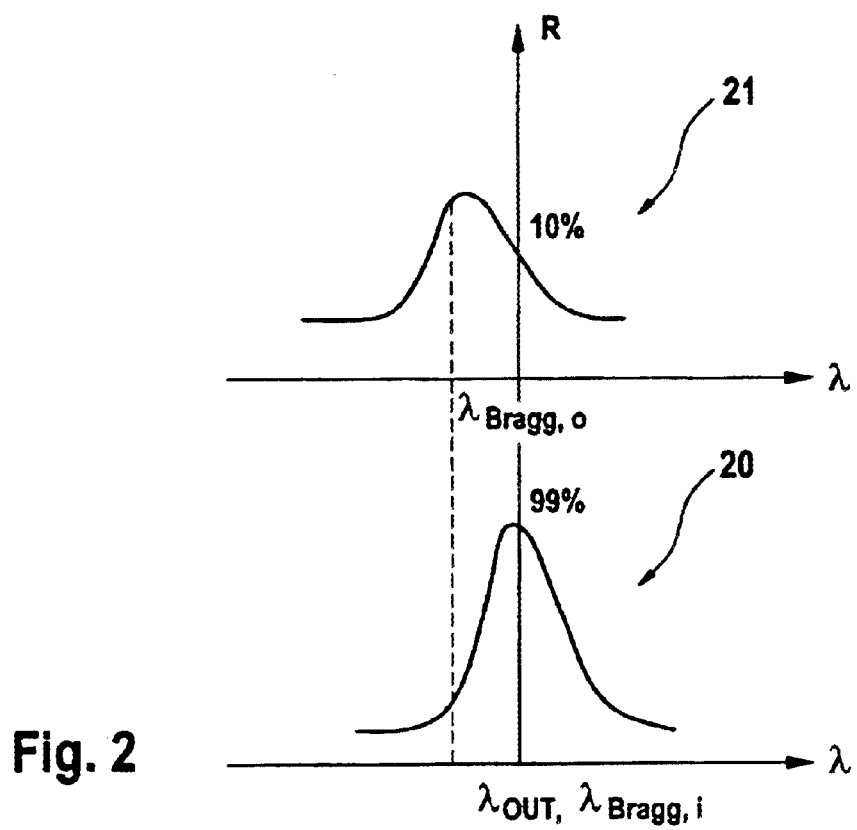
FIG. 2 shows the reflectivity vs. wavelength curve of the output Bragg gratings of the laser of FIG. 1

As schematically illustrated in FIG. 2, where the reflectivity R vs. wavelength $\lambda$ curves of two Bragg gratings are shown, curve 20 being the one for a Bragg grating of a pair located at the input section and having a center wavelength $\lambda_{Bragg,i}$ equal to one of the output wavelengths $\lambda_{OUT}$, and curve 21 being the corresponding output Bragg grating, located at the output section, and having a center wavelength $\lambda_{Bragg,o}$ shifted with respect to the output wavelength $\lambda_{OUT}$.

It is understood from these curves that the shift of the center wavelength of the output grating with respect to the output wavelength allows to select the required reflectivity of such grating according to the desired output power for the given channel. If the reflectivity at the initial center wavelength of the grating is e.g. 20%, it is therefore possible, by shifting the center wavelength, to decrease said reflectivity linearly (due to the triangular shape of the profile), which allows a wide range of possible reflectivities and therefore a very precise control of the output power.

It has been found that a shift of the center wavelength corresponding to a increase (which corresponds to a decrease of the reflectivity at the output wavelength) is preferred to an decrease, as it allows a still more precise adjustment of the reflectivity. Shifting the center wavelength towards higher wavelengths ensures that there will be a laser effect at the maximum of reflectivity of the output grating.

In order to still optimize the results of a laser according to the invention, the difference between the wavelengths of maximum and minimum reflectivity is less than or equal to 0.5 nm, and preferably 0.1 nm for the Bragg gratings other than the output Bragg gratings, i.e. for gratings 151 to 159, 164 to 169 and 17.

In addition, for the Bragg gratings having a center wavelength which is distinct from one of the output wavelengths, bearing reference numbers 154 to 159, 164 to 169 and 17, the full width at half maximum reflection bandwidth is at least 2 nm.

For the Bragg gratings of the input section 15 having a center wavelength equal to one of said output wavelengths, i.e. Bragg gratings 151, 152 and 153, the full width at a reflectivity value at 10 dB under the maximum is 2 nm.

Means for shifting the center wavelengths of Bragg gratings 161, 162 and 163 are schematically illustrated in FIG. 1 with reference numbers 181, 182 and 183.

There exist solutions well known to the man skilled in the art to shift the center wavelength of a Bragg grating.

This may be done by modifying the pitch of the grating, e.g. by heating the grating with Peltier elements. Thermal expansion of the fiber under heat increases the pitch $\Lambda$ of the grating and thus the center wavelength $\lambda_{Bragg}$ according to the following relationship:

$$\lambda_{Bragg} = \Lambda/2 \cdot n_{eff}$$

where $n_{eff}$ is the refractive index of the fiber.

Another possible solution is to stretch the grating with an adapted mechanical system. Such systems are described e.g. in the article "Chirping optical fiber Bragg gratings using tapered-thickness piezoelectric ceramic". M. Pacheco et al., Electron. Letters, vol. 34, pp. 2348–2350, 1998. The article "Dispersion variable fiber grating using a piezoelectric stack", M. M. Ohn et al., Electron. Letters, vol. 32, pp. 2000–2001, 1996 also describes means for stretching Bragg gratings.

The advantage of the use of such means lies in the fact that the shift in center wavelength is proportional to the stretching of the Bragg grating, so that there is a linear relationship between the reflectivity of the Bragg grating and the output control voltage of the piezoelectric means.

With the laser 10 of FIG. 1, it has been possible to obtain three output channels of 1440, 1455 and 1487 nm each having an output power of 200 mW for a pump power of the $Yb^{3+}$ laser of 3 W.

Similar results have been obtained with a laser having a similar configuration to the one illustrated in FIG. 1 (also pumped with a $Yb^{3+}$ laser and using a germano-silicate fiber), but having output wavelengths of 1427, 1455 and 1480 nm with the corresponding output gratings having adjustable reflectivity, the center wavelengths of the in-line pairs of reflectors being 1167, 1223, 1284 and 1351 nm.

Similar results have also been obtained with a laser having a similar configuration to the one illustrated in FIG. 1 (also pumped with a $Yb^{3+}$ laser but using a phospho-silicate fiber), but having output wavelengths of 1427, 1455 and 1480 nm with the corresponding output gratings having adjustable reflectivity, the center wavelengths of the in-line pairs of reflectors being 1312 and 1365 nm.

Figure 3:
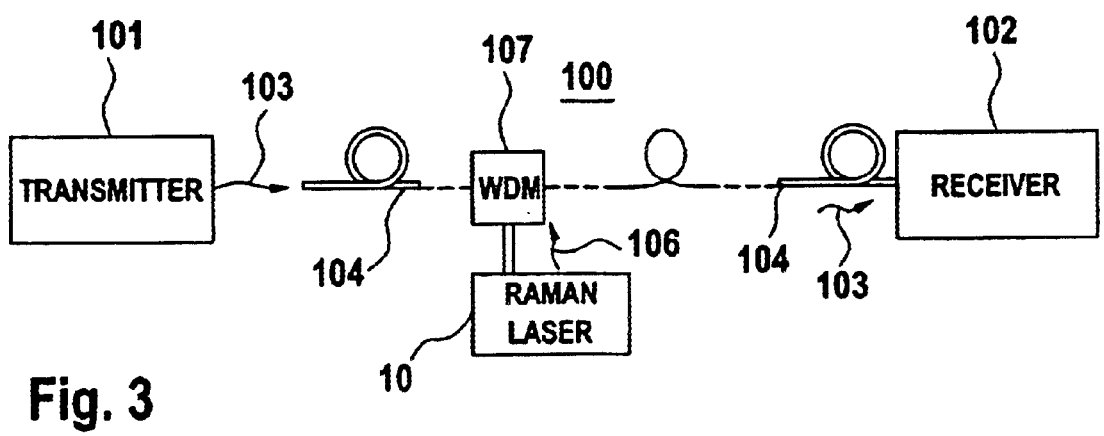
FIG. 3 shows schematically a Raman pre-amplified optical fiber communication system that comprises a Raman laser according to the invention.

FIG. 3 schematically depicts an optical system 100 according to the invention, incorporating a laser as laser 10 of FIG. 1.

Optical system 100 is a Raman pre-amplified optical fiber communication system comprising:

transmitter means 101 receiver means 102 spaced apart from transmitter means 101.

Signal radiation 103 (e.g. of wavelength 1550 nm) is coupled into conventional transmission fiber 104 and transmitted therethrough to the receiver means 102. Pump radiations 106 for the distributed Raman amplification is provided by laser 10 according to the invention, coupled into the transmission fiber 104 by conventional WDM 107. The Raman laser 10 provides radiations of wavelengths 1440, 1455 and 1487 nm suitable for pumping of the transmission fiber 104 such that the signal radiation 103 is amplified.

For clarity sake, only one WDM multiplexer has been shown on FIG. 3, but it is to be understood that several such means are disposed along the length of transmission fiber 104.

Of course, the present invention is not limited to the embodiments described above.

Although in-line refractive index fiber gratings are currently preferred reflector means, use of other reflector means is also contemplated. For instance, an optical cavity can be formed by coupling the length of optical fiber to planar waveguide reflectors.

In addition, ordering of the reflector means according to the teachings of U.S. Pat. No. 5,815,518 can also be applied to lasers of the present invention.

At last, the invention applies as well to WDM transmission systems using Raman pre-amplification with Erbium-doped fiber amplifiers (EDFAs) as to WDM transmission systems using Raman amplification alone.

The invention can also be applied for pumping a Dispersion Compensation Fiber (DCF) instead of a line fiber.

What is claimed is:

1. A cascaded multi-wavelength Raman fiber laser adapted for emitting radiation of at least one wavelength $\lambda_{s1}$, comprising:

a length of optical fiber having input and output sections means for introducing pump radiation of wavelength $\lambda_p$ into said length of optical fiber at least one pair of spaced-apart reflector means, said pair defining an optical cavity belonging to said optical fiber, each of said reflector means having a center wavelength, the reflector means of each pair being located respectively at said input section and said output section of said optical fiber at least one of said pairs of reflector means having its reflector means located at said output section, called output reflector means, having a lower reflectivity at said center wavelength than the corresponding reflector means of the same pair located at said input section, so as to emit radiation of said output wavelengths out of said optical fiber wherein the reflectivity vs. wavelength function of said output reflector means is such that the difference between the wavelengths of maximum and minimum reflectivity is at least 1 nm so that the reflectivity of said output reflector means at said output wavelength is adjustable.

2. Fiber laser according to claim 1 wherein the difference between the wavelengths of maximum and minimum reflectivity is at least 3 nm.

3. Fiber laser according to claim 1 wherein the difference between the wavelengths of maximum and minimum reflectivity is at least 4 nm.

4. Fiber laser according to claim 1 wherein it comprises at least two pairs of reflector means and in that it is adapted for emitting radiation of at least two distinct wavelengths $\lambda_{s1}$, $\lambda_{s2}$.

5. Fiber laser according to claim 1 wherein the initial center wavelength of said output reflector means is lower than the center wavelength of the corresponding input reflector means of the same pair.

6. Fiber laser according to claim 1 wherein the center wavelength of said output reflector means is adjustable.

7. Fiber laser according to claim 6 wherein adjustment of the center wavelength of said output reflector means is made by increasing said center wavelength.

8. Fiber laser according to claim 1 wherein the reflectivity vs. wavelength function of said output reflector means has a substantially triangular or Gaussian shape.

9. Fiber laser according to claim 1 wherein said reflector means are fiber Bragg gratings.

10. Fiber laser according to claim 9 wherein the reflector means which are not output reflector means are such that the difference between their wavelengths of maximum and minimum reflectivity is less than or equal to 0.5 nm.

11. Fiber laser according to claim 9 wherein the reflector means which are not output reflector means have a full width at half maximum reflection bandwidth of at least 2 nm.

12. Fiber laser according to claim 9 wherein the reflector means located at said input section and whose center wavelengths are equal to said output wavelengths have a full width of 2 nm at a reflectivity value at 10 dB under the maximum.

13. Fiber laser according to claim 9 wherein said output reflector means have a full width at half maximum reflection bandwidth less than or equal to 2,5 nm.

14. Fiber laser according to claim 9 wherein it comprises means for shifting the center wavelength of the Bragg gratings of said output reflector means.

15. Fiber laser according to claim 14 wherein shifting of the center wavelength is obtained by heating or straining said Bragg grating.

16. Optical fiber communication system comprising a fiber laser according to claim 1 further comprising:

transmitter means that comprise means for generating a signal radiation of wavelength $\lambda_{signal}$ receiver means spaced apart from said transmitter means that comprise means for detecting the signal radiation at $\lambda_{signal}$, optical fiber transmission means that connect said transmitter and receiver means means for coupling the output radiation of wavelength $\lambda_{s1}$ of said Raman laser into said optical fiber transmission means.

17. Optical Raman amplifier comprising a fiber laser according to claim 1.

* * * * *